United States Patent
Ruppert et al.

(10) Patent No.: US 11,684,058 B2
(45) Date of Patent: Jun. 27, 2023

(54) NARROW TRANSPORT BOOM FOLDING HINGE SYSTEM

(71) Applicant: CNH Industrial America LLC, New Holland, PA (US)

(72) Inventors: Rex LeRoy Ruppert, Benson, MN (US); Nicholas R. Pederson, Willmar, MN (US); Charles O'Connell, Willmar, MN (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 334 days.

(21) Appl. No.: 16/810,235

(22) Filed: Mar. 5, 2020

(65) Prior Publication Data

US 2021/0274771 A1    Sep. 9, 2021

(51) Int. Cl.
*A01M 7/00* (2006.01)
*A01M 9/00* (2006.01)

(52) U.S. Cl.
CPC ........ *A01M 7/0075* (2013.01); *A01M 9/0076* (2013.01)

(58) Field of Classification Search
CPC .............. A01M 7/0075; A01M 9/0076; A01M 7/0053; A01M 7/0078; A01M 7/0071; A01B 73/048; A01B 73/067
USPC ........................................................ 239/167
See application file for complete search history.

(56) References Cited

U.S. PATENT DOCUMENTS

| | | | |
|---|---|---|---|
| 3,085,695 A * | 4/1963 | Miller ...................... | E02F 9/14 212/300 |
| 4,117,892 A | 10/1978 | Dietrich et al. | |
| 4,379,522 A * | 4/1983 | Elliott ................. | A01M 7/0078 239/167 |
| 4,588,128 A * | 5/1986 | Broyhill .............. | A01M 7/0075 239/168 |
| 4,709,857 A | 12/1987 | Wilger et al. | |

(Continued)

FOREIGN PATENT DOCUMENTS

| | | |
|---|---|---|
| EP | 3053437 A1 | 9/2017 |
| EP | 3372078 A1 | 9/2018 |
| FR | 2880516 A1 | 7/2006 |

OTHER PUBLICATIONS

River Bend—River Bend Industries Custom Triple Fold Sprayer 88' (Folding Out)—<https://www.youtube.com/watch?v=KWlijbijfZQ>, last visited on Jul. 22, 2019. See also <https://www.youtube.com/watch?v=OO7Qlp-PNYA>.

*Primary Examiner* — Joseph A Greenlund
*Assistant Examiner* — Kevin Edward Schwartz
(74) *Attorney, Agent, or Firm* — Rebecca Henkel; Rickard Demille

(57) ABSTRACT

A hinge system is provided for a boom of an agricultural product applicator that facilitates a compact folded boom width in a transport mode by providing a multi-directional folding, including folding with compound movement components to reorient a primarily horizontal stack of boom sections to a primarily vertical stack of the boom sections, when fully folded. The hinge system may include multiple hinge joints with pivot axes that are oriented at different angles to allow for substantially horizontal folding movements followed by a rolling-type movement(s) that reorients a generally horizontal stack of boom sections into a generally vertical stack of boom sections to decrease an overall width of the applicator when in transport mode.

9 Claims, 10 Drawing Sheets

(56) References Cited

U.S. PATENT DOCUMENTS

| | | | |
|---|---|---|---|
| 4,739,930 A | 4/1988 | Pask | |
| 5,029,757 A | 7/1991 | Bourgault et al. | |
| 5,178,328 A | 1/1993 | Broyhill | |
| 5,348,226 A | 9/1994 | Heiniger et al. | |
| 5,673,854 A | 10/1997 | Kinder | |
| 6,035,942 A * | 3/2000 | Smith | A01B 59/00 111/59 |
| 6,402,051 B1 | 6/2002 | Humpal | |
| 6,719,213 B1 * | 4/2004 | Ferguson | A01M 7/0075 239/165 |
| 7,364,096 B1 | 4/2008 | Sosnowski et al. | |
| 8,464,967 B2 * | 6/2013 | Kuphal | A01M 7/0053 239/161 |
| 8,646,702 B2 * | 2/2014 | Barker | A01M 7/0075 239/164 |
| 8,899,496 B2 | 12/2014 | Wissler | |
| 9,462,799 B2 | 10/2016 | Bouten | |
| 9,848,592 B2 * | 12/2017 | Peters | A01M 7/0071 |
| 10,188,023 B2 * | 1/2019 | Schlimgen | A01B 73/044 |
| 10,194,648 B2 | 2/2019 | Hiddema et al. | |
| 10,966,367 B2 * | 4/2021 | Crucianelli | A01B 73/065 |
| 2012/0298388 A1 * | 11/2012 | Bauer | A01B 73/065 172/311 |
| 2013/0248619 A1 | 9/2013 | Kuphal et al. | |
| 2014/0034341 A1 * | 2/2014 | Fast | A01B 73/067 172/311 |
| 2016/0038961 A1 * | 2/2016 | Carlson | A01M 7/0075 239/168 |
| 2017/0055454 A1 * | 3/2017 | Michael | B65G 33/32 |
| 2018/0027736 A1 * | 2/2018 | Van Mill | A01F 12/46 |
| 2019/0133025 A1 * | 5/2019 | Lopan | A01B 73/048 |
| 2020/0085032 A1 * | 3/2020 | Lasne | A01M 7/0075 |

* cited by examiner

NARROW TRANSPORT BOOM FOLDING HINGE SYSTEM

FIELD OF THE INVENTION

The present invention pertains to agricultural product applicators and, more specifically, to a narrow transport boom folding hinge system to fold an applicator boom for transportation.

BACKGROUND OF THE INVENTION

Agricultural product delivery systems are known to utilize various mechanisms, including mechanical and pneumatic systems to apply granular or particulate material or product, such as fertilizer, seed, insecticide or herbicide. Dry agricultural product applicators are getting larger and faster to gain efficiency by allowing increased coverage in a single pass and in less time per pass. Even though the applicators and their booms are getting larger, they still need to be transportable.

Typically, applicators have foldable booms that can be folded-in to provide transport modes suitable for road transport. Some foldable booms have a bi-fold configuration in which each boom arm is folded in half and is then pivoted back and towards the applicator's frame, with each folded-over boom arm supported on a rack or boom cradle when it is in transport mode. However, even when folded in half, each boom arm may extend rearwardly beyond the back of the applicator frame. This can subject the folded boom to substantial forces since part of the folded boom arm's length is cantilevered beyond the boom cradle. Furthermore, it can be challenging turning the applicators because the rearwardly extending boom arms can sweep across a relatively large area while turning.

As the length of boom arms increase, more of the folded boom arms extend rearwardly causing these issues to worsen. Attempts to increase the number of hinges in boom arms to decrease the length of the boom arms extending behind the boom cradle have been attempted. While increasing the number of hinges in a boom arm does increase the number of times the boom arm can fold and therefore shortens the amount of the boom arm that extends behind the boom cradle, the additional hinges do not allow for easier transportation. When the boom arm is folded multiple times, the resulting stack of boom sections extend horizontally from both sides of the applicator. Thus, while the length of the boom arm is reduced, the increased width of the applicator correlates with the number of times the boom arm is folded therefore also making the applicator difficult to transport due to the increased width of the applicator.

It is therefore desirable for a folding hinge system that will allow a boom arm to be folded multiple times to reduce the length of the folded boom arm as well as allowing easier transportation.

SUMMARY OF THE INVENTION

A hinge system is provided for a boom of an agricultural product applicator that facilitates a compact folded boom width in a transport mode by having vertically stacked boom sections in the transport mode, without having to vertically fold the boom sections. This may be done by initially folding boom sections along generally horizontal sweeping fold paths into a horizontal stack(s) that is relatively wide and short and then reorienting the horizontal stack vertically, to provide a vertical stack that is relatively tall and narrow. A hinge system pivot axis may have a compound orientation angle, which is tilted along two planes, to provide a rolling-type motion that converts the horizontal stack to a vertical stack while pivoting the stack against the side(s) of the applicator to achieve a fully folded transport position.

According to one aspect of the invention, the compound pivot axis hinge may be implemented in a trifold boom that may fold according to a z-fold type back-and-forth folding methodology. The compound pivot axis hinge or inner hinge may connect a boom arm, such as an inner boom section of a boom arm, to the applicator's chassis such as directly or by way of an intervening boom frame that is attached to the chassis. The compound pivot axis hinge may be oriented forward and toward the applicator chassis to achieve the horizontal stack to vertical stack rolling-type reorientation in a single swept plane of movement. The pivot axis of the compound pivot axis hinge may be tilted forward at least 30° and typically tilted forward about 45° or 45° plus or minus 10-percent. The pivot axis of the compound pivot axis hinge may also be tilted in at least 30° and typically tilted in about 45° or 45° plus or minus 10-percent.

According to another aspect of the invention, a narrow transport boom folding hinge system is provided for an agricultural product applicator. The applicator's boom has multiple boom sections and defines an unfolded in-use position when in a boom in-use state and a folded transport position when in a boom fully folded state. The narrow transport boom folding hinge system may include an intermediate hinge arranged between a pair of adjacent boom sections. One of the adjacent boom sections pivots with respect to the other one boom sections of the pair about the intermediate hinge to define a boom partially folded state as a stack of partially folded boom sections. The intermediate hinge may define an intermediate hinge pivot axis that is arranged in a first orientation when the respective boom section pivots from the in-use state to the partially folded state. An inner hinge may be arranged between the applicator's chassis and an inner-most boom section. The inner-most boom section may pivot about the inner hinge to convert the boom from the partially folded state to the boom fully folded state. The inner hinge may have an inner hinge pivot axis that is misaligned with respect to the intermediate hinge pivot axis. The different angle of the inner hinge pivot axis is configured so that while the stack of partially folded boom sections pivots from the partially folded state to the fully folded state, the intermediate hinge pivot axis changes orientation. The inner hinge may correspondingly reorient the previous mostly or substantially horizontally stacked boom sections to a mostly or substantially vertically stacked orientation.

The inner hinge or compound pivot axis hinge may include a hinge arm having a first and second hinge arm end. Each hinge arm end is attached to a sidewall of the hinge lobe pivot portion of a hinge lobe. The hinge lobe includes a hinge lobe rod portion that extends through an aperture of the hinge lobe pivot portion allowing the compound pivot axis hinge to pivot. The hinge arm is further connected to an actuator arm. The actuator arm is connected to an actuator, allowing the boom arm to fold and unfold.

In order to fold the fully extended boom arms, first, an outer boom section can be horizontally pivoted or rotated clockwise so that the outer boom section is adjacent to a middle boom section or an intermediate boom section. A second outer boom section end of the outer boom section is therefore adjacent to a first middle boom section end of the middle boom section. Secondly, the outer boom section and the middle boom section can be horizontally pivoted or rotated counterclockwise so that the middle boom section is adjacent to both the outer boom section and inner boom section. A first inner boom section end of the inner boom section is therefore adjacent to a second middle boom section end of the middle boom section and the first outer boom section end, and the second inner boom section end is adjacent to both the first middle boom section end and the second outer boom section end. Thirdly, all three boom sections are pivoted or rotated upwards so that the outer boom section, the middle boom section, and the inner section are orientated vertically after rotating. Fourthly, the outer boom section, the middle boom section, and the inner boom section are pivoted or rotated rearwards so that the outer boom section, the middle boom section, and the inner boom section are vertically stacked adjacent to a boom frame after rotating.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

For the purpose of illustration, certain embodiments of the present invention are shown in the drawings. It should be understood, however, that the invention is not limited to the precise arrangements, dimensions, and instruments shown. Like numerals indicate like elements throughout the drawings. In the drawings.

While the invention is described herein in connection with certain preferred embodiments, there is no intent to limit it to those embodiments. On the contrary, the intent is to cover all alternatives, modifications and equivalents within the spirit and scope of the invention as defined by the appended claims.

DETAILED DESCRIPTION OF THE INVENTION

Figure 1:
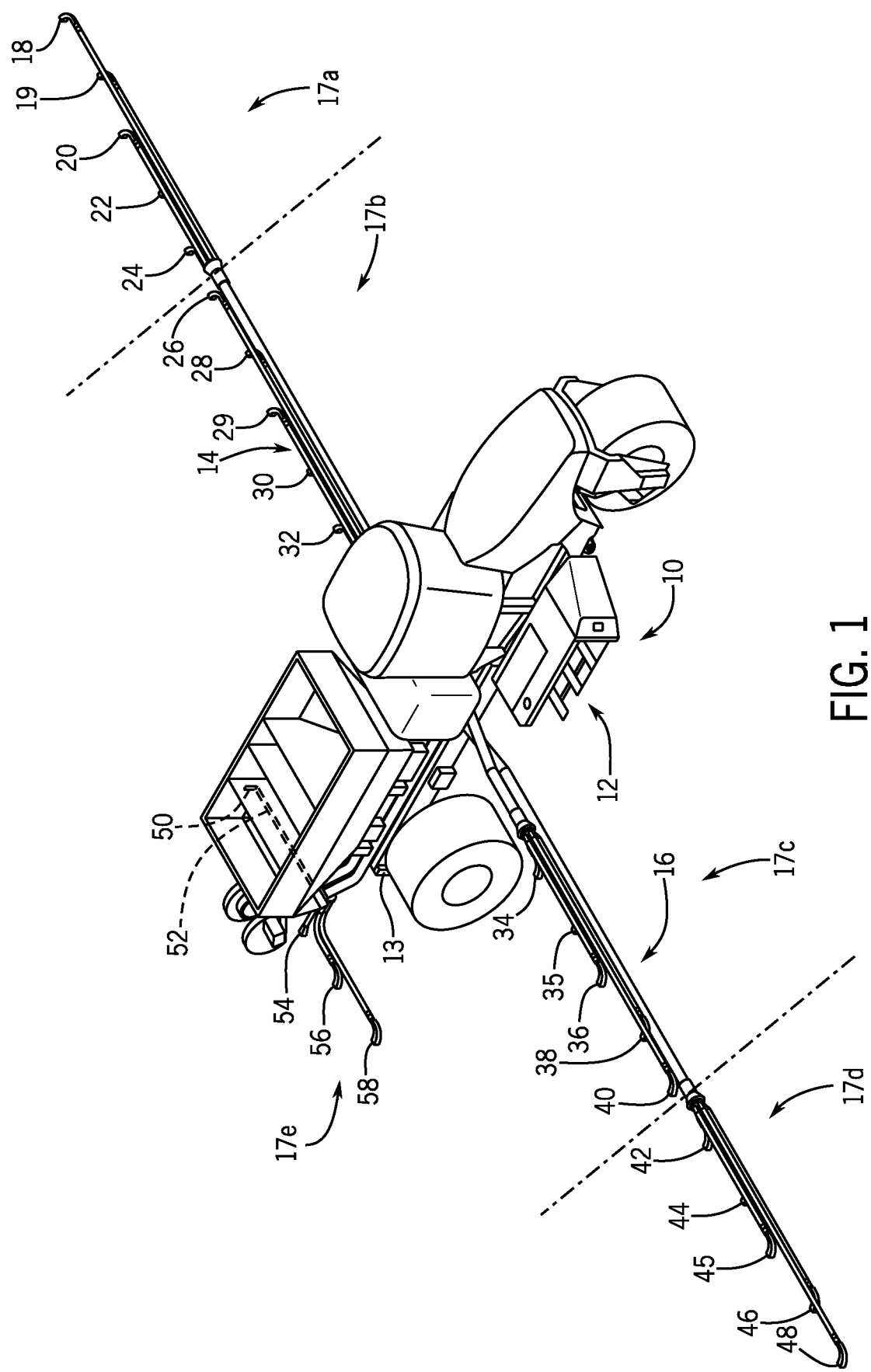
FIG. 1 illustrates an isometric view of an agricultural product application implement, in the form of a dry granular product applicator with a narrow transport boom folding hinge system having a compound pivot axis hinge according to the present invention.

Referring now to the drawings, and more particularly to FIG. 1, there is shown an agricultural application implement 10, which could be a dry pneumatic granular applicator. As is known in the art, implement 10 generally includes a large wheeled transport unit 12 such as truck or tractor, a boom frame 13, and laterally extending particle delivery boom arms 14 and 16, which may be pivoted to a stowed position close to the boom frame 13 for storage or transport. Each boom arm 14, 16 is supported by the boom frame 13 and extends laterally from the implement 10 in opposite directions. Each boom arm 14, 16 includes a plurality of boom sections 17, such as left outer and left inner boom sections 17A, 17B of boom arm 14, and right inner and right outer boom sections 17C, 17D of boom arm 16 in this example. Each boom section 17 includes a large diameter supply line for supplying the boom section 17 with granular or particulate material, such as seed, fertilizer, herbicide, insecticide and the like, which are typically supported by boom section frame or other structural components, not shown in this view.

Each boom section 17 includes a plurality of boom tubes sections or conduits terminating at particle delivering units, which for the implement 10 are spreading outlets or nozzles. In the exemplary embodiment shown, left outer boom section 17A of boom 14 includes five nozzles 18, 19, 20, 22 and 24; left inner boom section 17B of boom 14 includes five nozzles 26, 28, 29, 30 and 32; right inner boom section 17C of boom 16 includes five nozzles 34, 35, 36, 38 and 40; and right outer boom section 17D of boom 16 includes five nozzles 42, 44, 45, 46 and 48.

Additionally, at the back of implement 10 there is a centrally mounted rear boom section 17E also defined by a large diameter supply line (not shown) for supplying the boom section 17 with granular material. At the rear boom section 17E are five rear nozzles 50, 52, 54, 56 and 58 to provide full and complete coverage across the width of implement 10, including the area between the inboard-most nozzles 32 and 34 of boom arms 14, 16. The rear boom section 17E allows the spread of the particulate material/product over/onto the ground over which the implement 10 passes for complete coverage. Although five boom sections 17, with five nozzles per boom section 17, is shown by way of example, in other aspects greater or fewer boom sections 17, and/or greater or fewer nozzles per boom section 17, can be provided within the scope of the invention.

The length of the boom arms 14, 16, in conjunction with the rear boom section 17E, allow the agricultural application implement 10 to quickly and efficiently spread granular or particulate material onto the ground. However, the length of the boom arms 14, 16 makes them difficult to transport. The boom arms 14, 16, through pivotable or hinged connections between adjacent boom sections 17, may be folded for easier transportation.

Figure 2:
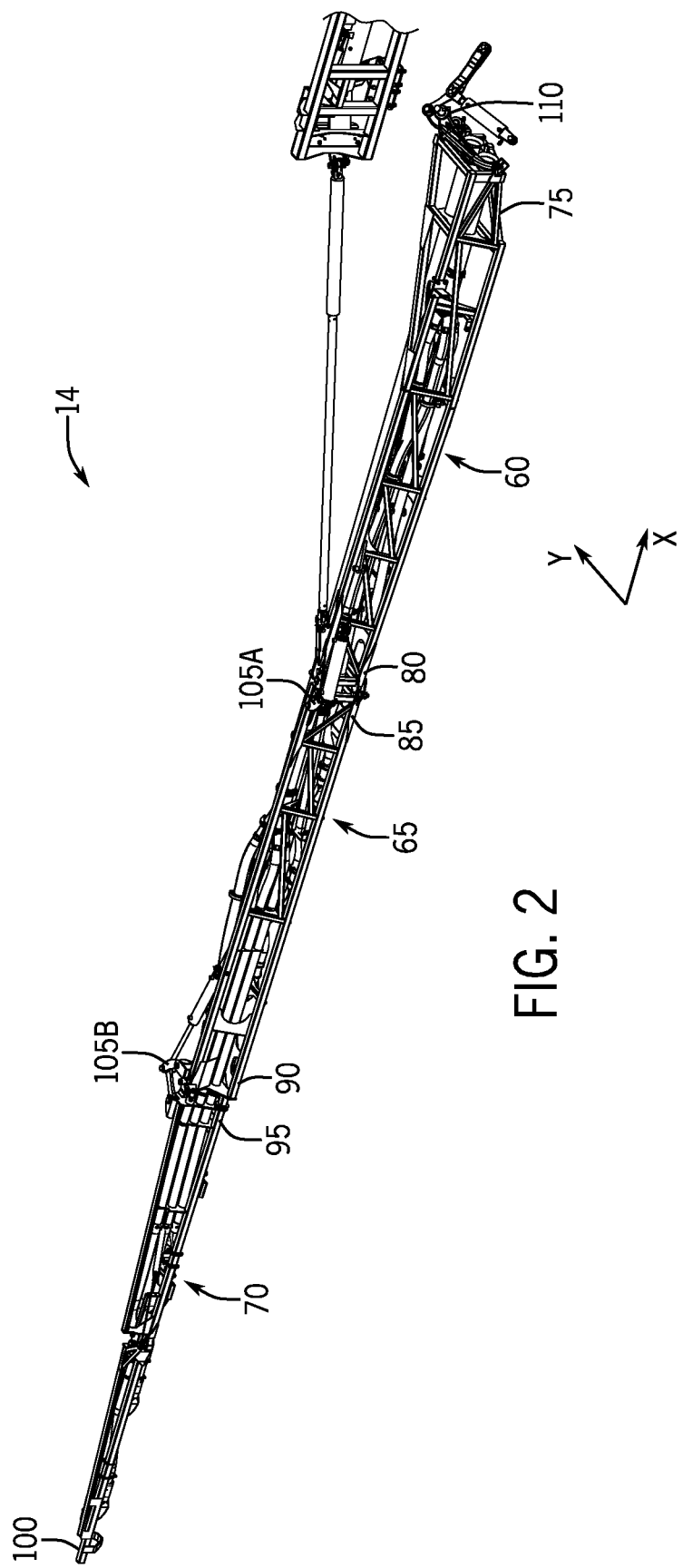
FIG. 2 illustrates an isometric view of a fully extended right-hand side boom arm.

As illustrated in FIG. 2 and using boom arm 16 as an example to describe the structure and components of boom arms 14, 16, boom arm 16 is divided into three boom sections 17, an inner boom section 60, an intermediate or middle boom section 65, and an outer boom section 70. As described in the current example embodiment, intermediate and middle are used interchangeably. The intermediate boom section 65 is any boom section 17 located between the inner boom section 60 and the outer boom section 70, while the middle boom section 65 is a boom section 17 located directly between the inner boom section 60 and the outer boom section 70. Thus, while the middle boom section 65 is always an intermediate boom section 65, an intermediate boom section 65 may not necessarily be the middle boom section 65. The inner boom section 60, the middle boom section 65, and the outer boom section 70 are located on substantially the same longitudinal axis or x-axis X. The inner boom section 60 includes a first inner boom section end 75 and a second inner boom section end 80, while the middle boom section 65 includes a first middle boom section end 85 and a second middle boom section end 90. Finally, the outer boom section 70 includes a first outer boom section end 95 and a second outer boom section end 100.

The inner boom section 60 pivotally engages with the middle boom section 65 through an intermediate hinge shown as a first pivot hinge 105A, where the second inner boom section end 80 and the first middle boom section end 85 are adjacent to and abuts the first pivot hinge 105A. The intermediate hinge 105A is therefore arranged between a pair of adjacent boom sections 17. The middle boom section 65 also pivotally engages the outer boom section 70 through an outer hinge shown as second pivot hinge 105B. The second pivot hinge 105B is adjacent to and abuts the second middle boom section end 90 and the first outer boom section end 95. The inner boom section 60 pivotally engages with the boom frame 13 (shown in FIG. 1) or chassis of the agricultural product applicator 10 though an inner hinge shown as compound pivot axis hinge 110 located and positioned adjacent to and abutting the first inner boom section end 75, as will be explained in more detail hereinafter. In this illustrated example, intermediate and outer or first and second pivot hinges 105 and inner or compound pivot axis hinge 110 allows the boom arm 14 to trifold and to be folded into a Z-like shape.

Figure 3:
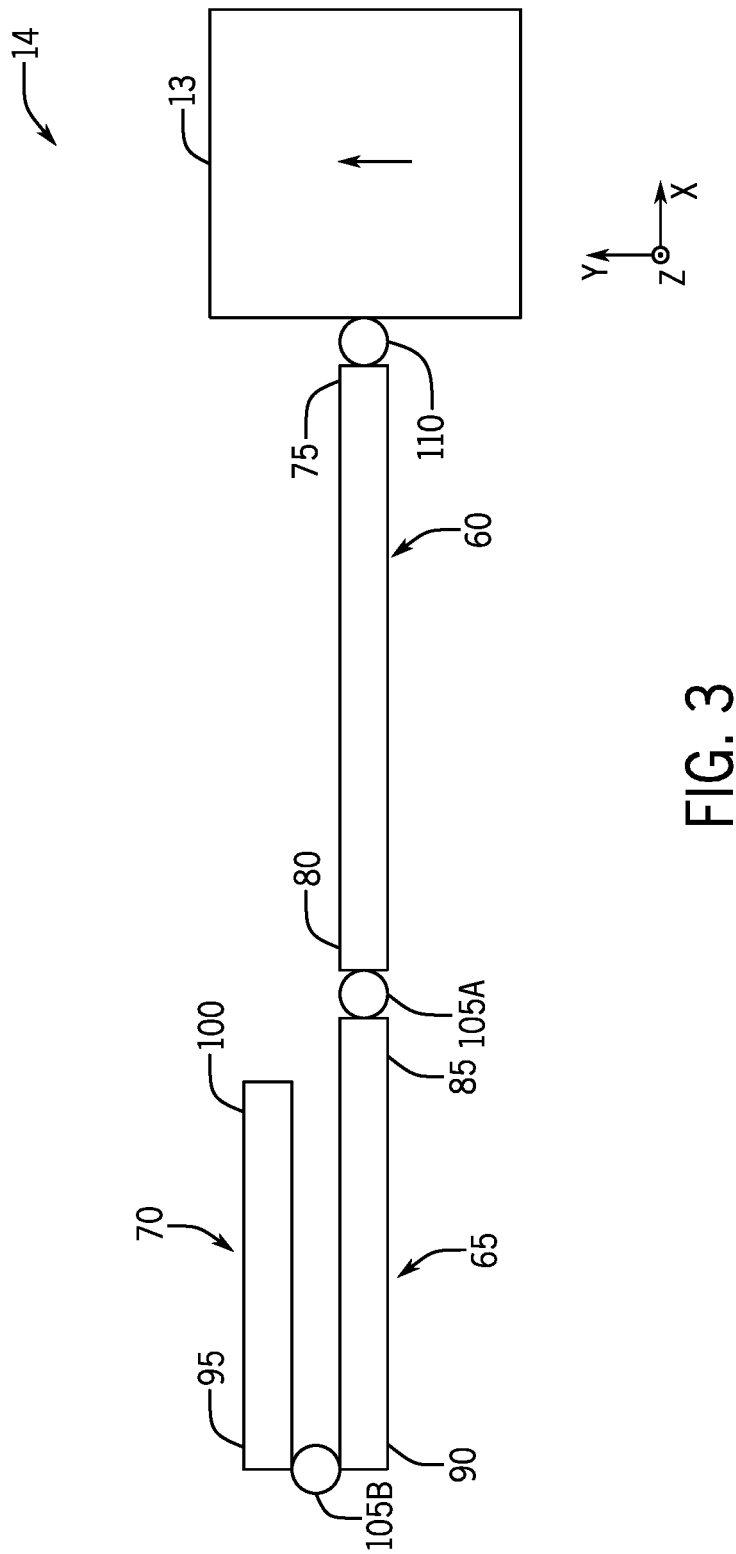
FIG. 3 illustrates a top plan view of a first step to fold the boom arm of FIG. 2.

In order to fold the boom arm 16 for transportation, the boom arm 16 undergoes a three-step folding process. Before the boom arm 16 is folded for transportation, the boom arm 16 is in a boom in-use state and is preferably fully extended in an unfolded in-use position, as seen in FIG. 2. Turning to FIG. 3, in step one of the four-step process, the second pivot hinge 105B allows the outer boom section 70 to fold or pivot about a hinge toward the middle boom section 65 along the x axis X in a generally horizontal first direction with respect to the intermediate boom section 65 to provide an outer folded horizontal stack of boom sections 17 in a boom partially folded state. The second outer boom section end 100 of the outer boom section 70 is therefore adjacent to or side-by-side to the first middle boom section end 85 of the middle boom section 65. In one embodiment, the second outer boom section end 100 rotates clockwise until the second outer boom section end 100 is adjacent to the first middle boom section end 85.

Figure 4:
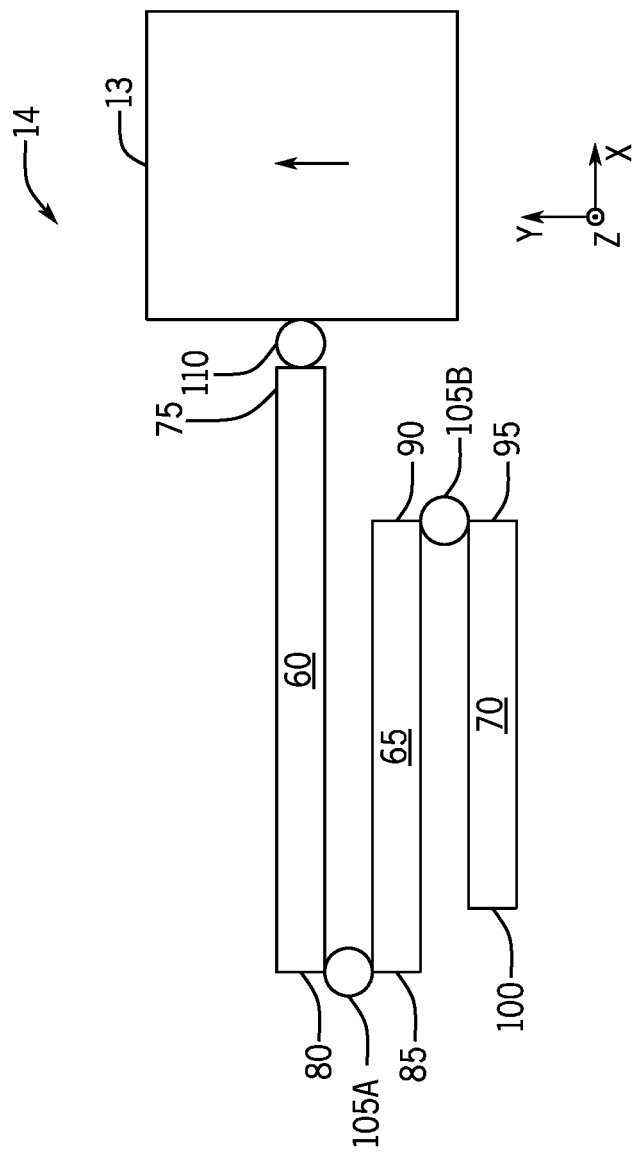
FIG. 4 illustrates a top plan view of a second step to fold the boom arm of FIGS. 2 and 3.

In step two and as shown in FIG. 4, both the side-by-side outer boom section 70 and middle boom section 65 then fold or pivot about a hinge along the first pivot hinge 105A in a generally horizontal second direction, an opposite direction from step one, to provide a full horizontal stack of boom sections 17 (outer boom section 70, middle boom section 65, and inner boom section 70) horizontally stacked with respect to each other when the boom arm 16 is in a partially folded state. The intermediate hinge or first pivot hinge 105A therefore is arranged between adjacent boom sections, middle boom section 65 and inner boom section 60, where one of the adjacent boom sections 17 pivots with respect to the other one of the adjacent boom sections 17 to form a partially folded boom.

In other words, the folded outer boom section 70, as well as the middle boom section 65, folds longitudinally counterclockwise towards the inner boom section 60 so that the boom arm 16 is folded in an accordion-like or Z-like style, as illustrated in FIG. 4. Thus, in step two, the boom arm 16 is folded so that the first inner boom section end 75 is adjacent to the second middle boom section end 90 and first outer boom section end 95, while the second inner boom section end 80 is adjacent to the first middle boom section end 85 and second outer boom section end 100. The middle boom section 65 is therefore sandwiched between the outer boom section 70 and the inner boom section 60. In an alternative embodiment, the outer boom section 60 and middle boom section 65 may fold in opposite directions than as previously described above in steps one and two. For example, the outer boom section 60 may fold counterclockwise in step one, while both the outer boom section 60 and middle boom section 65 may fold clockwise in step two of the folding process.

Figure 5:
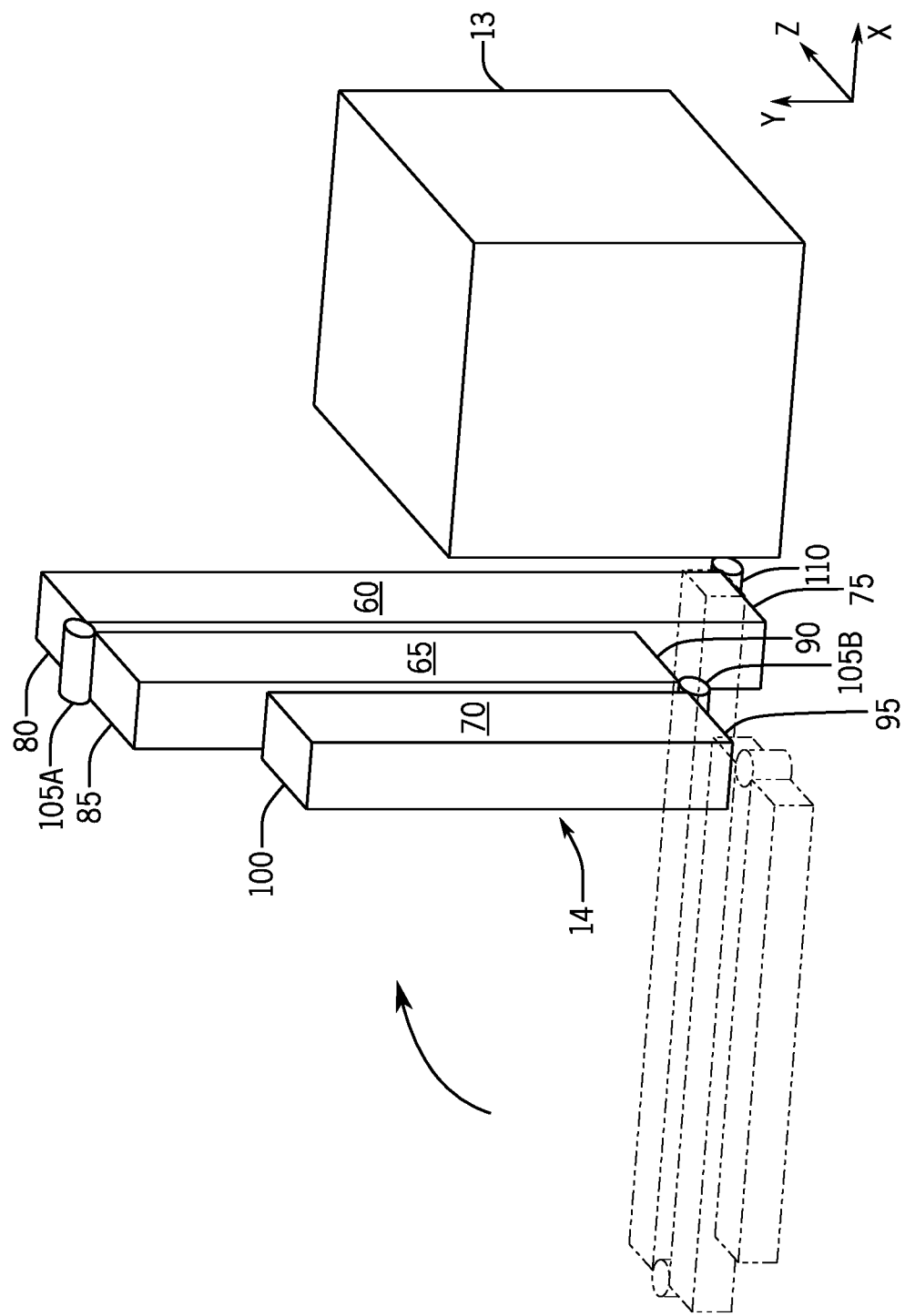
FIG. 5 illustrates an isometric view of a third step to fold the boom arm of FIGS. 2-4.

In step three and as illustrated in FIG. 5, the folded boom arm 14 with its full horizontal stack of boom sections 17 lifts or pivots upwards as well as pivots or rolls backwards towards the rear boom section 17E using the compound pivot axis hinge 110, with both a horizontal travel component and a vertical travel component, so that the folded boom arm 16 extends laterally in the z axis Z. In more detail, as the folded boom arm 14 rotates along the z axis Z, using the compound pivot axis hinge 110, the second outer boom section end 100 of the outer boom section 70, first middle boom section end 85 of the middle boom section 65, and the second inner boom section end 80 rotates back at least 80°. The inner boom section 60, middle boom section 65, and outer boom section 70 are therefore vertically stacked on top of each other, not horizontally stacked, adjacent to the boom frame 13 so that the folded boom arm 14 does not substantially increase the width of the applicator 10. In other words, the folded boom arm 16 no longer extends substantially horizontally on the x axis X from the boom frame 13 but extends vertically in a vertical stacked orientation in which the side-by-side outer boom section 70, middle boom section 65, and inner boom section 60 are substantially vertically stacked with respect to each other. Furthermore, the pivot hinges 105 and compound pivot axis hinge 110 are no longer in substantially the same x axis X, but are located in substantially the same z axis Z. In one embodiment, the folding process may be engaged and completed with a single press auto-fold control feature (not shown).

The boom arms 14, 16 can therefore be tri-folded in a Z-like or accordion-like style for transportation. Once folded and ready for transportation, the boom arms 14, 16 form a vertical column or stack of boom arm sections 17 adjacent to the boom frame 13. The folded boom arms 14, 16 are further located and positioned close to the boom frame 13 to form an agricultural application implement 10 with a similar width as an unfolded agricultural application implement 10 (excluding the width of the boom arms 14, 16). The amount, if any, that the folded boom arms 14, 16 extend past the boom frame 13 has also been reduced (compared to bi-folded boom arms) allowing the agricultural application implement 10 to be more easily and safely transported.

Figure 6:
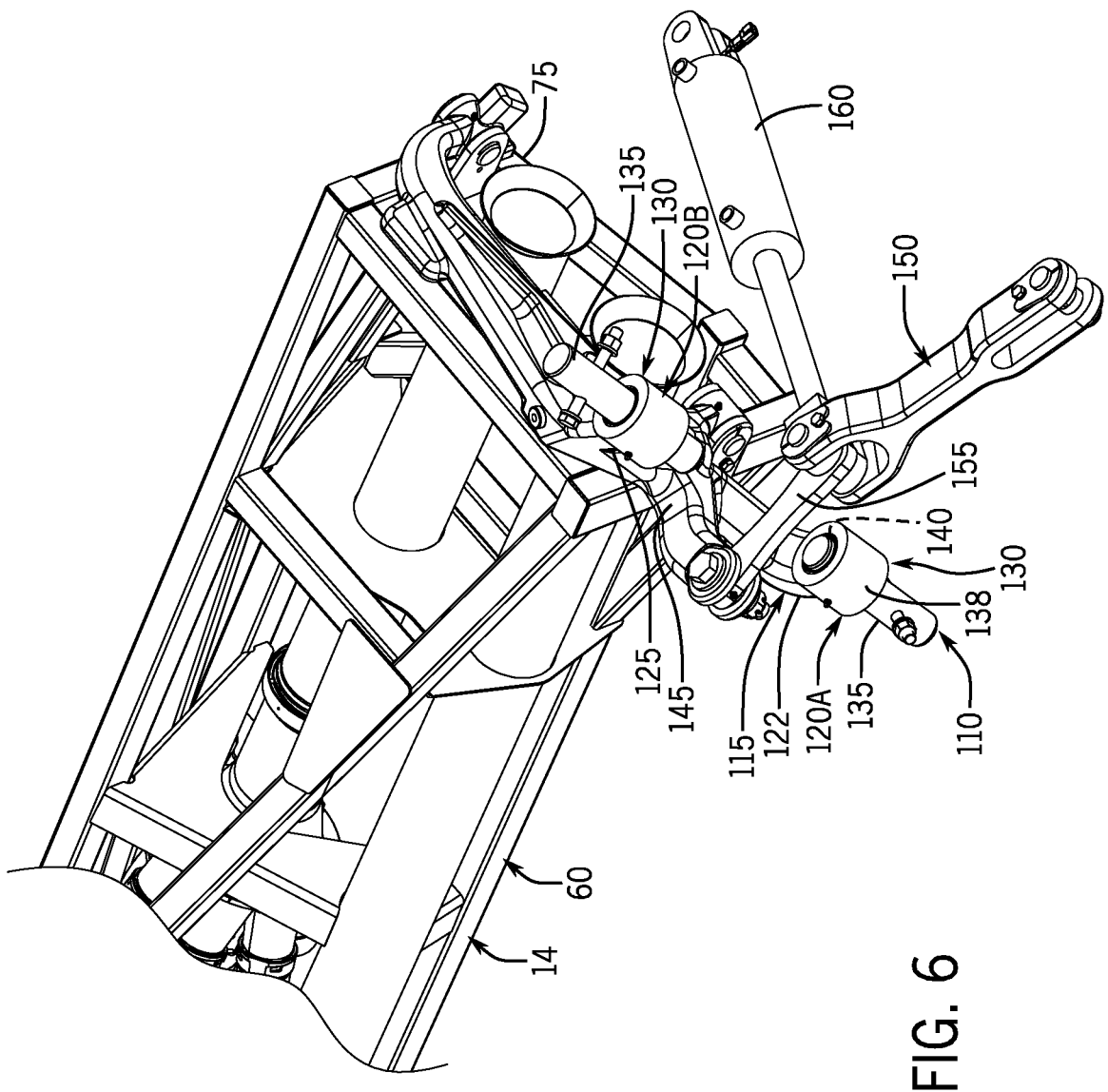
FIG. 6 illustrates an isometric view of the compound pivot axis hinge.

A key component of the novel trifold folding system is the compound pivot axis hinge 110. Turning to FIG. 6, the compound pivot axis hinge 110 connects the left-hand side boom arm 14 to the boom frame 13 and also allows the folded boom arm 14 to lift upwardly and pivot rearwardly so that the boom sections 17 (inner boom section 60, middle boom section 65, and outer boom section 70) can vertically stack adjacent to the boom frame 13. The compound pivot axis hinge 110 includes a hinge arm 115 and two hinge lobes 120. The hinge arm 115 may be a C-like shaped member that extends across at least a portion of, as well as being attached to, the inner boom section 60 at the first inner boom section end 75. In one embodiment, the hinge arm 115 may be pinned to the inner boom section 60.

The hinge arm 115 is a member that includes a first hinge arm end 122 and a second hinge arm end 125. The first and second hinge arm ends 122, 125 are preferably curved so that the hinge arm 115 forms a C-like shape, with a first hinge lobe 120A and a second hinge lobe 120B extending from hinge arm ends 122, 125, respectively. Each hinge lobe 120 preferably includes a hinge lobe pivot portion 130 and a hinge lobe rod portion 135. The hinge lobe pivot portion 130 is preferably an annular ring, where a sidewall 138 of the hinge lobe pivot portion 130 is adjacent to and abuts the hinge arm end 122 (or hinge arm end 125). The hinge lobe rod portion 135 is preferably a cylindrical member or pin that extends through a center or aperture 140 of the hinge lobe pivot portion 130. The hinge lobe rod portion 135 further extends into a portion of the boom frame 13 (not shown) allowing, in conjunction with the hinge lobe pivot portion 130, the hinge lobe 120 to pivot about a hinge when the boom arm 14 is pivotally engaged with the boom frame 13. The compound pivot axis hinge 110 therefore has a split hinge joint with a single hinge axis.

The compound pivot axis hinge 110 further includes an actuator arm 145, a member that projects away or outwardly from the hinge arm 115. In one embodiment, the actuator arm 145 extends from approximately the center of the hinge arm 115, spaced substantially equally apart from the hinge lobes 120. The split hinge joint with the single hinge axis, the curved hinge arm 115, along with actuator arm 145 extending therefrom, reduces the amount of space needed and allows the compound pivot axis hinge 110 to fit between the boom arm 14 and boom frame 13.

Figure 7:
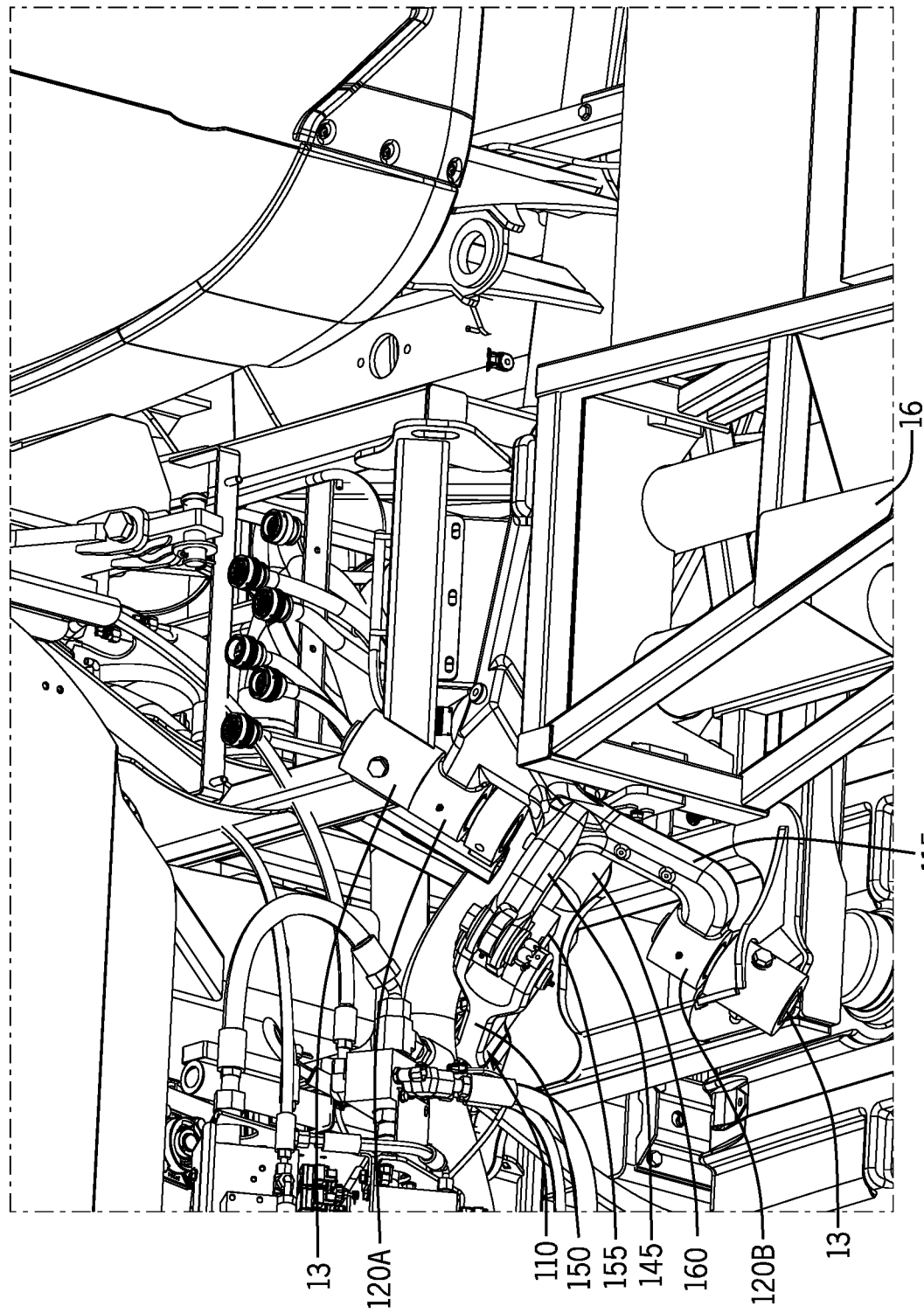
FIG. 7 illustrates an isometric view of the compound pivot axis hinge of FIG. 6 pivotally engaged to a left-hand side boom arm in an extended position and a boom frame.
Figure 8:
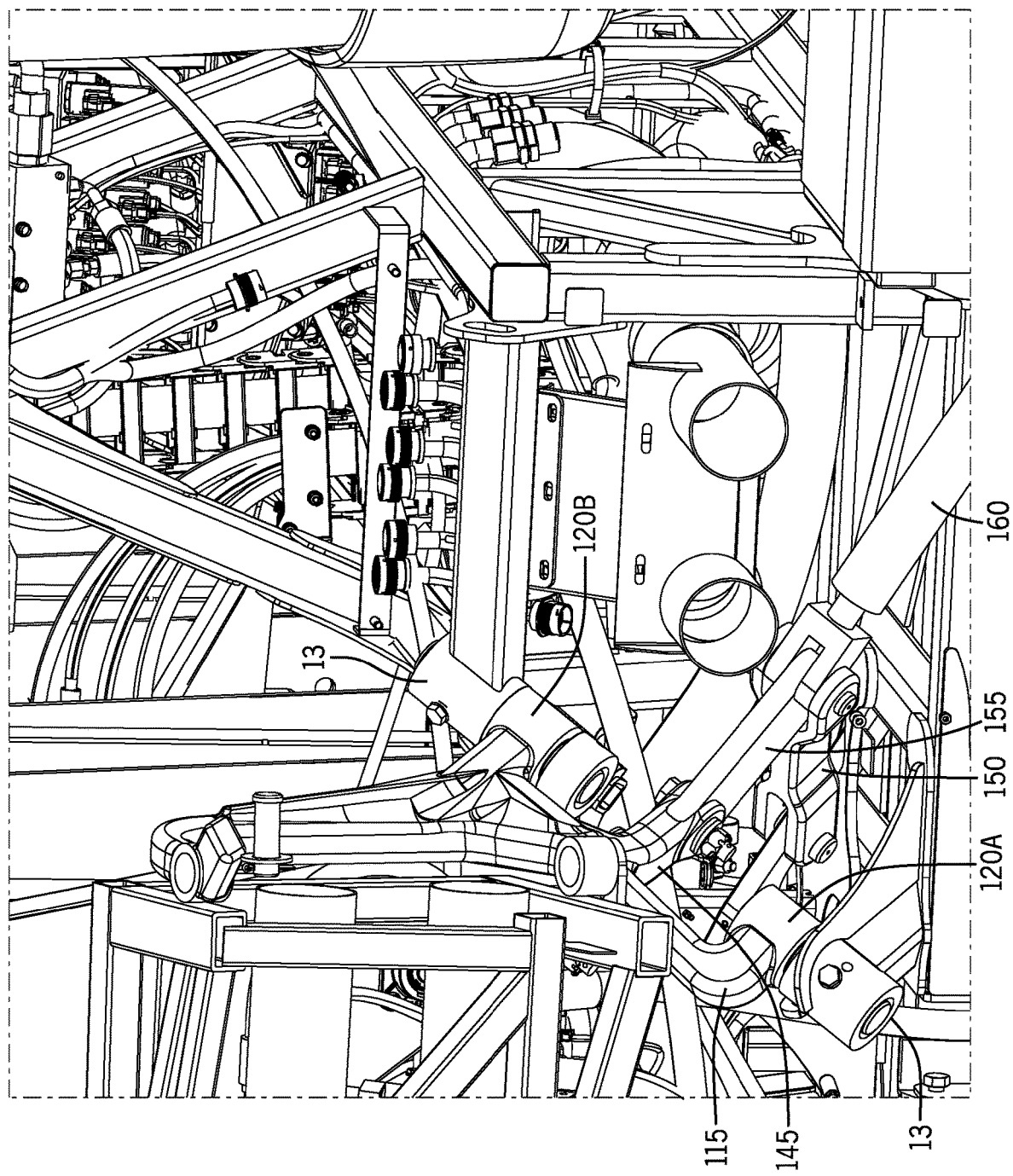
FIG. 8 illustrates an isometric view of the compound pivot axis hinge of FIGS. 6 and 7 pivotally engaged to the boom arm of FIGS. 2-5 and 7 in a folded position and the boom frame of FIG. 7.
Figure 9:
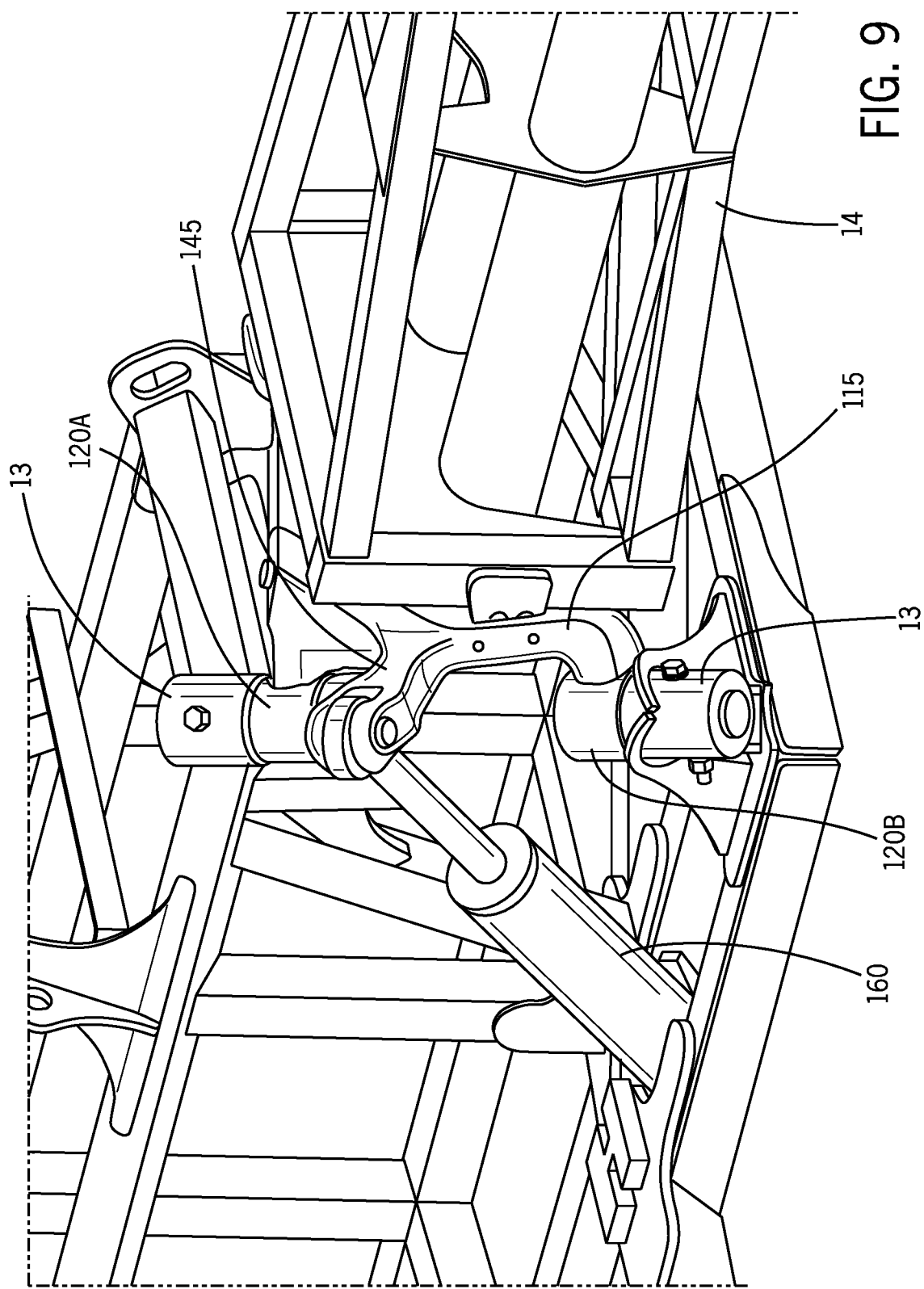
FIG. 9 illustrates an isometric view of an alternative compound pivot axis hinge pivotally engaged to a left-hand side boom arm in an extended position and a boom frame.
Figure 10:
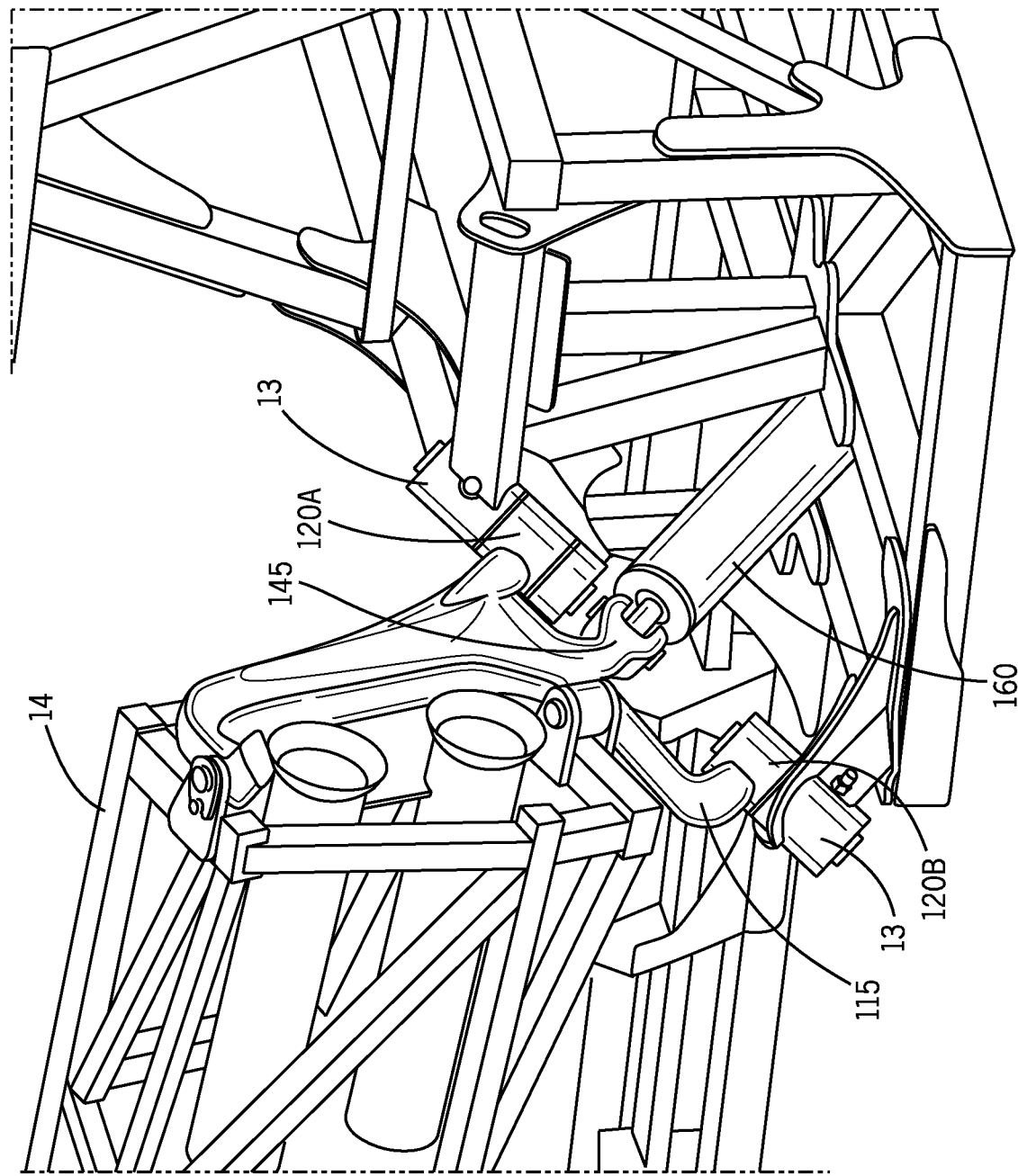
FIG. 10 illustrates an isometric view of the compound pivot axis hinge of FIG. 9 pivotally engaged to the boom arm in a folded position and the boom frame.

The actuator arm 145 engages an actuator 155 located and positioned opposite from the hinge arm 115. The actuator 155 further engages a shaft arm 150 located and positioned on the opposite side of the actuator 155, as well as a piston 160. As seen in FIGS. 7 and 8, the piston 160 and actuator 155 actuate the movement of the hinge arm 115, allowing the hinge lobes 120 and the lobes of the boom frame 13 to pivot, facilitating the folding or unfolding the boom arm 14. Alternatively, as seen in FIGS. 9 and 10, the piston 160 actuates the movement of the hinge arm 115, allowing the hinge lobes 120 and lobes of the boom frame 13 to pivot and the boom arm 14 to fold or unfold.

The first and second hinge lobes 120 are further coaxially aligned with each other to define a compound pivot hinge axis angle that is tilted in a longitudinal forward or rearward direction with respect to a longitudinal axis of the agricultural product applicator 10 and is further tilted in a transverse inward or outward direction with respect to a longitudinal axis X of the agricultural product applicator 10. In the current embodiment, the compound pivot axis hinge 110 is located on the x axis X and is further tilted at least 30° and is typically tilted 45° plus or minus 10-percent inwards towards the boom frame 13, as well as tilted at least 30° and is typically tilted about 45° plus or minus 10-percent longitudinally forwards (forwards being the front of the boom frame 13, opposite and across from boom section 17E) with respect to a longitudinal axis X defined by an upper end of the inner hinge 110 relative to a lower end of the inner hinge 110.

In greater detail, the intermediate hinge or first pivot hinge 105A has an intermediate hinge pivot axis that is arranged in a first orientation. The first orientation of the intermediate hinge pivot axis of the intermediate hinge 105A allows the outer boom section 70 and the middle boom section 65 to pivot from the in-use state of the boom arm 14 to the partially folded state. The first orientation of the intermediate hinge pivot axis is further arranged substantially vertical to fold the adjacent middle boom section 65 along a generally horizontal swept path with the stack of partially folded boom sections 17 (outer boom section 70 and middle boom section 65) to define a substantially horizontally stacked configuration.

The intermediate hinge 105A further defines a second orientation of an inner hinge pivot axis of the inner hinge or compound pivot axis hinge 110. The inner hinge pivot axis of the inner hinge 110 is misaligned with respect to the intermediate hinge pivot axis of the intermediate hinge 105A, so that the angle of the second orientation of the inner hinge pivot axis converts the substantially horizontal stacked configuration of the stack of partially folded boom sections 17 to a substantially vertical stacked configuration when pivoting the substantially horizontal stacked configuration, in a partially folded state, to the fully folded state. Thus, the intermediate hinge pivot axis changes orientation as the stack of the partially folded boom sections 17 pivots from the partially folded state to the fully folded state.

The structure of the compound pivot axis hinge 110, as well as its tilted or angled positioning with respect to the intermediate hinge 105A, allows the folded boom sections 17 to be lifted as well as pivot or roll backwards to safely reduce the length of the folded boom arms 14, 16 as well as substantially maintaining the width of the implement 10 when the boom arms 14, 16 are folded and ready to be transported.

Although the best modes contemplated by the inventors of carrying out the present invention are disclosed above, practice of the above invention is not limited thereto. It will be manifest that various additions, modifications and rearrangements of the features of the present invention may be made without deviating from the spirit and the scope of the underlying inventive concept.

What is claimed is:

1. A narrow transport boom folding hinge system for an agricultural product applicator with a boom supported by a chassis of the agricultural product applicator, the boom having multiple boom sections and defining an unfolded in-use position when in a boom in-use state and a folded transport position when in a boom fully folded state, the narrow transport boom folding hinge system comprising:

an intermediate hinge arranged between a pair of adjacent boom sections of the multiple boom sections, the intermediate hinge defining an intermediate hinge pivot axis, one boom section of the pair of adjacent boom sections being pivotable about the intermediate hinge pivot axis with respect to another boom section of the pair of adjacent boom sections to define a boom partially folded state as a stack of partially folded boom sections, the intermediate hinge pivot axis being arranged in a first orientation when the one boom section of the pair of adjacent boom sections pivots with respect to the other boom section of the pair of adjacent boom sections from the boom in-use state to the boom partially folded state;

an inner hinge arranged between the chassis of the agricultural product applicator and an inner-most boom section of the multiple boom sections, the inner hinge defining an inner hinge pivot axis, the boom being pivotable about the inner hinge pivot axis from the boom partially folded state to the boom fully folded state, the inner hinge pivot axis being misaligned with respect to the intermediate hinge pivot axis so that while the stack of partially folded boom sections pivots from the boom partially folded state to the boom fully folded state, the intermediate hinge pivot axis changes to a second orientation, the inner hinge comprising:
  a hinge arm having a first hinge arm end and a second hinge arm end;
  two hinge lobes including a first hinge lobe and a second hinge lobe, each of the first hinge lobe and the second hinge lobe having a hinge lobe pivot portion and a hinge lobe rod portion, the first hinge arm end of the hinge arm extending from a sidewall of the hinge lobe pivot portion of the first hinge lobe, and the second hinge arm end of the hinge arm extending from a sidewall of the hinge lobe pivot portion of the second hinge lobe, the first hinge lobe and the second hinge lobe being coaxially aligned to define the inner hinge pivot axis; and
  an actuator arm extending from the hinge arm, the actuator arm being spaced apart from the first hinge lobe and the second hinge lobe; and
an actuator engaged with the actuator arm, the actuator being selectively operable to pivot the boom about the inner hinge pivot axis;
wherein the inner hinge pivot axis defines a compound pivot axis angle, the compound pivot axis angle being both:
  tilted in one of a longitudinal forward direction or a longitudinal rearward direction with respect to a longitudinal axis of the agricultural product applicator; and
  tilted in one of a transverse inward direction or a transverse outward direction with respect to the longitudinal axis of the agricultural product applicator.

2. The narrow transport boom folding hinge system of claim 1, wherein:
  in the first orientation, the intermediate hinge pivot axis is arranged substantially vertically to fold the respective adjacent boom section along a generally horizontal swept path with the stack of partially folded boom sections defining a substantially horizontal stacked configuration; and
  the inner hinge pivot axis is arranged at an angle such that pivoting the substantially horizontal stacked configuration of the stack of partially folded boom sections about the inner hinge pivot axis converts the stack of partially folded boom sections to a substantially vertical stacked configuration and moves the intermediate hinge pivot axis into the second orientation.

3. The narrow transport boom folding hinge system of claim 1, wherein the inner hinge pivot axis is tilted forward and inward with respect to the longitudinal axis of the agricultural product applicator as defined by an upper end of the inner hinge relative to a lower end of the inner hinge.

4. The narrow transport boom folding hinge system of claim 1, further comprising an outer hinge, wherein:
  the multiple boom sections include an inner boom section, an intermediate boom section, and an outer boom section, the pair of adjacent boom sections including the inner boom section and the intermediate boom section, the inner boom section being the inner-most boom section,
  the outer hinge connects the outer boom section to the intermediate boom section; and
  during a folding sequence:
    the outer boom section pivots about the outer hinge in a generally horizontal first direction with respect to the intermediate boom section to provide an outer folded horizontal stack of boom sections in the boom partially folded state;
    the outer folded horizontal stack of boom sections pivots about the intermediate hinge in a generally horizontal second direction opposite the first direction with respect to the inner boom section to provide a full horizontal stack of boom sections with the outer, intermediate, and inner boom sections horizontally stacked with respect to each other when in the boom partially folded state; and
    the full horizontal stack of boom sections pivots about the inner hinge with both a horizontal travel component and a vertical travel component to roll the full horizontal stack of boom sections from a horizontally stacked orientation to a vertically stacked orientation in which the outer, intermediate, and inner boom sections are substantially vertically stacked with respect to each other.

5. The narrow transport boom folding hinge system of claim 1, wherein the hinge lobe rod portion is located and positioned within and extending from an aperture of the hinge lobe pivot portion.

6. The narrow transport boom folding hinge system of claim 1, wherein the hinge arm is curved between the first hinge arm end and the second hinge arm end.

7. The narrow transport boom folding hinge system of claim 1, wherein at least a portion of the hinge arm is integrally formed from the inner boom section.

8. The narrow transport boom folding hinge system of claim 1, wherein the hinge arm is directly coupled to one of the chassis or the inner-most boom section, and
  wherein the hinge lobe rod portion of each of the first hinge lobe and the second hinge lobe is directly coupled to another of the chassis or the inner-most boom section.

9. A method of folding a boom of a self-propelled dry agricultural product applicator comprising the steps of:
  pivoting an outer boom section of a fully extended boom arm horizontally in a first direction to sit in a side-by-side orientation next to an intermediate boom section;
  pivoting the outer boom section and the intermediate boom section together in the side-by-side orientation horizontally in a second, opposite, direction so the intermediate boom section is directly against an inner boom section and the outer boom section, the intermediate boom section, and the inner boom section sit in a side-by-side orientation with respect to each other with the intermediate boom section sandwiched between the outer and inner boom sections as a horizontal stack; and
  controlling an operation of an actuator to pivot the outer boom section, the intermediate boom section, and the inner boom section together in the side-by-side orientation as the horizontal stack about an inner hinge pivot axis both horizontally and vertically to reorient the horizontal stack to a vertical stack that is generally parallel to a longitudinal axis of the self-propelled dry agricultural product applicator, the inner hinge pivot axis being defined by an inner hinge joint between the inner boom section and a chassis of the self-propelled dry agricultural product applicator, the inner hinge joint comprising a hinge arm having a first hinge arm end and a second hinge arm end, a first hinge lobe located at the first hinge arm end, and a second hinge lobe located at the second hinge arm end, with the first and second hinge lobes coaxially aligned with each other to define the inner hinge pivot axis, an actuator arm extending from the hinge arm, the actuator arm being spaced apart from the first hinge lobe and the second hinge lobe, the actuator being engaged to the actuator arm, wherein the inner hinge pivot axis defines a compound pivot axis angle, the compound pivot axis angle being both:

tilted in one of a longitudinal forward direction or a longitudinal rearward direction with respect to the longitudinal axis of the self-propelled dry agricultural product applicator; and tilted in one of a transverse inward direction or a transverse outward direction with respect to the longitudinal axis of the self-propelled dry agricultural product applicator.

\* \* \* \* \*